(12) United States Patent
Dubey

(10) Patent No.: US 10,796,518 B2
(45) Date of Patent: Oct. 6, 2020

(54) FEEDBACK AND AUTHENTICATION SYSTEM AND METHOD FOR VENDING MACHINES

(71) Applicant: Ria Dubey, Troy, MI (US)

(72) Inventor: Ria Dubey, Troy, MI (US)

( * ) Notice: Subject to any disclaimer, the term of this patent is extended or adjusted under 35 U.S.C. 154(b) by 0 days.

(21) Appl. No.: 15/881,833

(22) Filed: Jan. 29, 2018

(65) Prior Publication Data

US 2019/0236890 A1  Aug. 1, 2019

(51) Int. Cl.
| | | |
|---|---|---|
| *G07F 17/00* | (2006.01) | |
| *G06Q 10/08* | (2012.01) | |
| *G06Q 20/40* | (2012.01) | |
| *G07F 7/00* | (2006.01) | |
| *G06Q 20/32* | (2012.01) | |
| *G07F 9/00* | (2006.01) | |
| *G06K 7/00* | (2006.01) | |
| *G06K 17/00* | (2006.01) | |

(Continued)

(52) U.S. Cl.
CPC ....... *G07F 17/0064* (2013.01); *G06Q 10/087* (2013.01); *G06Q 20/3276* (2013.01); *G06Q 20/3278* (2013.01); *G06Q 20/40145* (2013.01); *G07F 7/005* (2013.01); *G07F 9/002* (2020.05); *G07F 9/006* (2013.01); *G07F 17/0014* (2013.01); *G06F 16/9554* (2019.01); *G06K 7/0004* (2013.01); *G06K 17/0022* (2013.01); *G06Q 20/18* (2013.01)

(58) Field of Classification Search
CPC ............ G07F 17/0064; G07F 17/0014; G06Q 10/087; G06F 16/9554; G06F 17/30879
USPC .......................................... 235/381, 385, 383
See application file for complete search history.

(56) References Cited

U.S. PATENT DOCUMENTS

| | | | |
|---|---|---|---|
| 9,715,666 B2 * | 7/2017 | Beier ..................... | G06Q 10/06 |
| 9,898,884 B1 * | 2/2018 | Arora ..................... | G07F 11/002 |

(Continued)

FOREIGN PATENT DOCUMENTS

| | | |
|---|---|---|
| CN | 204270399 U | 4/2015 |
| EP | 1469431 B1 | 9/2009 |

OTHER PUBLICATIONS

Tan, Leanne. Culture "40 Things You Don't Expect to Find in Vending Machines," http://www.hongkiat.com/blog/bizarre-vending-machines/ Downloaded 2018.

(Continued)

*Primary Examiner* — Paultep Savusdiphol
(74) *Attorney, Agent, or Firm* — Carlson, Gaskey & Olds, P.C.

(57) ABSTRACT

This disclosure relates to a feedback and authentication system and method for vending machines. In one example system, the system includes a vending machine configured to dispense an item purchased by a user. The item contains identifying tag which, when scanned, allows the user access to information about the item. Such information may include the creation date of the item, the expiration date of the item, and/or tracking information. The user can thus make an informed decision as to the freshness of the item, which is particularly useful when the item is a perishable item, such as a salad. By offering access to this sort of information, food distributors gain credibility with their customer base.

6 Claims, 2 Drawing Sheets

(51) Int. Cl.
*G06Q 20/18* (2012.01)
*G06F 16/955* (2019.01)

(56) References Cited

U.S. PATENT DOCUMENTS

| | | | | |
|---|---|---|---|---|
| 2003/0006281 A1* | 1/2003 | Thomas | ............... | B67D 1/0884 235/385 |
| 2004/0103033 A1* | 5/2004 | Reade | ................... | G06Q 20/20 705/16 |
| 2007/0097234 A1* | 5/2007 | Katayama | ............. | G06Q 10/00 348/239 |
| 2008/0189161 A1* | 8/2008 | Daily | .................... | G06Q 10/08 705/333 |
| 2009/0313125 A1* | 12/2009 | Roh | ................... | G06Q 30/0224 705/14.66 |
| 2010/0234986 A1* | 9/2010 | Clopton | ............... | G06Q 10/087 700/236 |
| 2010/0298899 A1* | 11/2010 | Donnelly | ........... | A61B 5/02055 607/6 |
| 2011/0059209 A1 | 3/2011 | Khatchadourian | | |
| 2012/0005105 A1* | 1/2012 | Beier | ..................... | G06Q 10/06 705/303 |
| 2013/0103537 A1* | 4/2013 | Hewett | ............. | G06Q 30/0633 705/26.7 |
| 2013/0231711 A1* | 9/2013 | Kaib | ................... | G06F 19/3418 607/5 |
| 2014/0089077 A1* | 3/2014 | Zuckerman | ......... | G07F 17/0064 705/14.37 |
| 2014/0091136 A1* | 4/2014 | Ybarra, Jr. | ........... | G06Q 10/087 235/375 |
| 2014/0172313 A1* | 6/2014 | Rayner | .................. | G16H 50/30 702/19 |
| 2014/0316561 A1* | 10/2014 | Tkachenko | ........... | G07F 11/002 700/236 |
| 2015/0118659 A1* | 4/2015 | Meyer | ................ | G09B 19/0092 434/127 |
| 2016/0307128 A1* | 10/2016 | Herman | ............. | G06Q 10/0633 |
| 2017/0293882 A1* | 10/2017 | Beier | ..................... | G06Q 10/06 |
| 2018/0005295 A1* | 1/2018 | Howell | .................... | H04Q 9/00 |
| 2018/0144821 A1* | 5/2018 | Irani-Cohen | ........... | G06Q 50/12 |
| 2018/0249723 A1* | 9/2018 | Hsu | ........................ | A23B 4/031 |
| 2019/0066181 A1* | 2/2019 | Victorin | ............. | G06Q 30/0623 |

OTHER PUBLICATIONS

Knutson, Ariel. Buzzfeed. "24 Vending Machines You Won't Believe Exist," https://www.buzzfeed.com/arielknutson/vending-machines-you-wont-believe-exist?utm_term=.imr4oWqvk#.ac4XpxjJw. Posted Jan. 14, 2013.

Schwartz, Sara. Delish. "Unusual Vending Machine Foods Around the World," http://www.delish.com/food/g1815/unusual-vending-machine-foods/?slide=8. Posted Jul. 15, 2010.

Bratskeir, Kate. Huffpost. "The Weirdest Food Vending Machines Around the World," http://www.huffingtonpost.com/2014/08/06/weird-food-vending-machines_n_1894217.html. Posted Sep. 19, 2012, Updated Aug. 6, 2014.

* cited by examiner

FEEDBACK AND AUTHENTICATION SYSTEM AND METHOD FOR VENDING MACHINES

TECHNICAL FIELD

This disclosure relates to a feedback and authentication system and method for vending machines.

BACKGROUND

Vending machines provide items such as food, snacks, and beverages, to consumers after receipt of payment. Vending machines exist in many countries, and in more recent times, specialized vending machines that provide less common products have been created and provided to consumers. Some specialized vending machines are capable of preparing and cooking food, such as pizza. Other vending machines offer fresh, prepared foods that are ordinarily only available in restaurants or convenience stores, such as salads or sandwiches.

SUMMARY

A method according to an exemplary aspect of the present disclosure includes, among other things, scanning an item purchased from a vending machine to access information about the item.

In a further non-limiting embodiment of the foregoing method, the scanning step is performed using a mobile device of a user.

In a further non-limiting embodiment of any of the foregoing methods, the item is a perishable food item, and wherein the information includes a history of the item.

In a further non-limiting embodiment of any of the foregoing methods, the history includes whether the item is organic.

In a further non-limiting embodiment of any of the foregoing methods, the history includes a plurality of events relating to the item, and the history further includes a timestamp corresponding to each of the events.

In a further non-limiting embodiment of any of the foregoing methods, the events include at least one of creation date, expiration date, and shipping information.

In a further non-limiting embodiment of any of the foregoing methods, the item includes an identification tag, and the scanning step includes scanning the identification tag with a mobile device.

In a further non-limiting embodiment of any of the foregoing methods, the identification tag includes one of a quick response (QR) code, a barcode, and a radio-frequency identification (RFID) tag.

In a further non-limiting embodiment of any of the foregoing methods, the information about the item is displayed on a web page.

A method according to another exemplary aspect of the present disclosure includes, among other things, capturing an image of a user after the user purchases an item from a vending machine.

In a further non-limiting embodiment of any of the foregoing methods, the capturing step includes taking a picture of the user with a camera.

In a further non-limiting embodiment of any of the foregoing methods, the capturing step is performed after the user scans the item to access information about the item.

In a further non-limiting embodiment of any of the foregoing methods, the capturing step is performed after the information about the item is displayed to the user.

In a further non-limiting embodiment of any of the foregoing methods, the method further includes determining a facial expression of the user in the image, and recording the determined facial expression.

In a further non-limiting embodiment of any of the foregoing methods, the image is one of a picture and a video.

A system according to an exemplary aspect of the present disclosure includes, among other things, a vending machine configured to dispense an item purchased by a user, the item containing identifying tag which, when scanned, allows the user to access information about the item.

In a further non-limiting embodiment of the foregoing system, a camera configured to capture an image of the user after the user purchases the item.

In a further non-limiting embodiment of any of the foregoing systems, the camera is configured to capture an image of the user after the user scans the item.

In a further non-limiting embodiment of any of the foregoing systems, the vending machine includes a transceiver configured to send the captured image to a server located remote from the vending machine.

In a further non-limiting embodiment of any of the foregoing systems, the image is one of a picture and a video.

DETAILED DESCRIPTION

This disclosure relates to a feedback and authentication system and method for vending machines. In one example system, the system includes a vending machine configured to dispense an item purchased by a user (i.e., a customer). The item contains an identifying tag which, when scanned, allows the user access to information about the item. Such information may include the creation date of the item, the expiration date of the item, and/or tracking information. Upon review of this information, the user can make an informed decision as to the freshness of the item, which is particularly useful when the item is a perishable item, such as a salad. By offering access to this sort of information, food manufacturers and distributors gain credibility with their customers. In another aspect of the present disclosure, images of the user are captured to determine user reactions to the food buying experience, including, for example, the reaction of the user to the information about the purchased item. Such reactions are compiled and studied by food distributors in order to determine the success of their products and processes.

Figure 1:
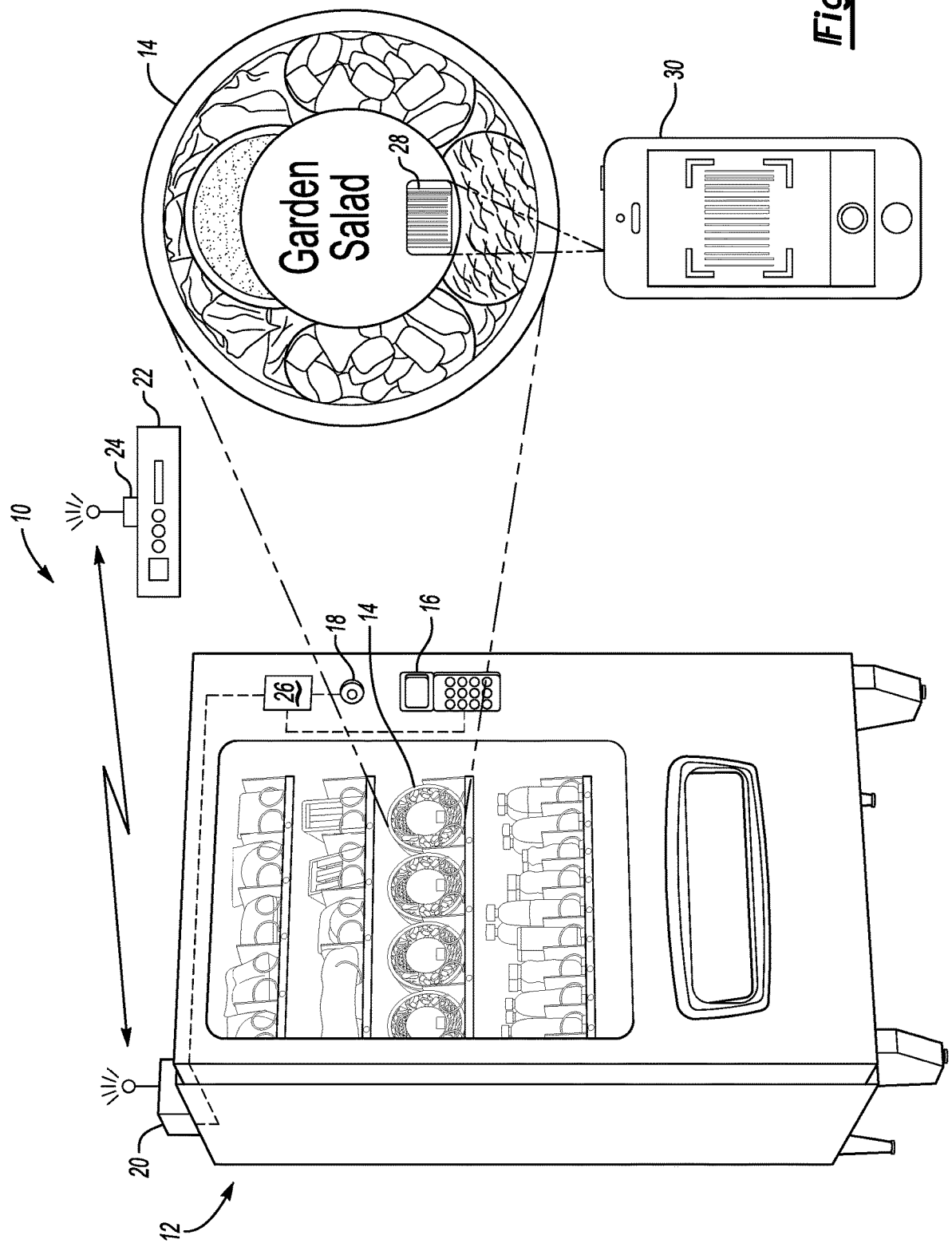
FIG. 1 schematically illustrates an example system.

Referring to the drawings, FIG. 1 schematically illustrates an example system 10 according to this disclosure. The system 10 includes a vending machine 12, which is an automated machine that provides items 14 such as food, snacks, and beverages, to users after receipt of payment. The vending machine 12 includes a terminal 16 allowing users to select an item 14 and to process payment. The terminal 16 is configured to accept several forms of payment, such as by coin money, paper money, credit cards, mobile payments, etc.

The vending machine 12 further includes a camera 18. The camera 18 is an optical instrument for recording and/or capturing images, such as pictures or video. In other words, the camera 18 may be a still camera or a video camera. In this example, the camera 18 is part of the vending machine 12. The camera 18 may a separate camera, however, mounted to the top or side of the vending machine 12, in other examples.

The vending machine 12 also includes a transceiver 20 configured to send and receive information between the vending machine 12 and other types of electronic equipment, such as a server 22. The server 22 is a known type of server, including hardware and software, and is remotely located from the vending machine 12, in a location such as an office of a food distributor. Like the vending machine 12, the server 22 includes a transceiver 24 configured to send and receive information to and from the vending machine 12. While only one server 22 is shown in FIG. 1, it should be understood that the server 22 represents one or more servers.

The vending machine 12 includes a controller 26, which is shown schematically in FIG. 1. It should be understood that the controller 26 could be part of an overall vending machine control module, or could alternatively be a standalone controller separate from a control module. Further, the controller 26 may be programmed with executable instructions for interfacing with and operating the various components of the vending machine 12. The controller 26 additionally includes a combination of hardware and software, and further includes a processing unit and non-transitory memory for executing the various control strategies and modes of the system 10.

In one aspect of this disclosure, the system 10 is operable to allow a user to scan the items 14 purchased from the vending machine 12, allowing the user access to information about the item 14. In this aspect of the disclosure, each item 14 includes identifying tag which, when scanned, directs the user to information about the item. The identifying tag may be any type of machine-readable optical label. In FIG. 1, the identifying tag is a barcode 28. This disclosure is not limited to barcodes, however, and extends to other types of identifying tags, such as quick response (QR) codes and a radio-frequency identification (RFID) tags.

In one example, the barcode 28 is integrated into the original packaging of the item 14. In another example, the barcode 28 is provided on a separate sticker adhered to the item 14. The barcode 28 may be scanned by a mobile device 30 of the user. The mobile device 30 in this example is a smartphone, but in other examples the mobile device 30 may be a tablet, portable or personal computer equipped with a screen, that may be touchscreen in some examples. The mobile device 30 is also equipped with a camera, and a central processing unit (CPU) executing a software application loaded in program memory. The mobile device 30 also has a data store that locally stores user data. Further, the mobile device 30 is configured to send and receive information from the vending machine 12 and the server 22. While a mobile device 30 is shown, it should be understood that the system 10 does not require mobile devices.

Figure 2:
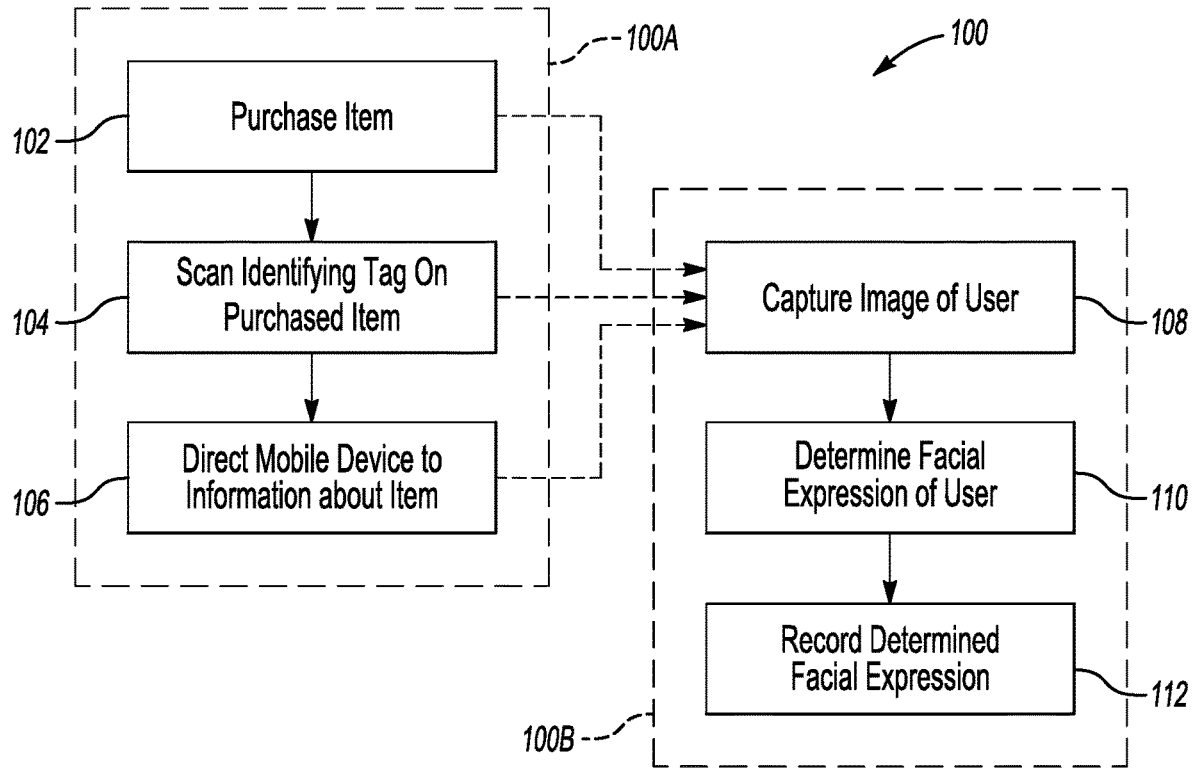
FIG. 2 is a flow chart representative of an example method according to this disclosure.

FIG. 2 is a flow chart representative of an example method 100. It should be understood that the method 100 will be performed, at least in part, by the components of the system 10.

A first aspect 100A of the method 100 relates to providing information about the item 14 to a user after the user purchases the product. The user may use this information to authenticate the product and to assess its freshness. This aspect 100A of the method 100 begins at 102, where the user purchases an item 14 from the vending machine 12. At 104, the user scans the purchased item 14. In one example, the user scans the barcode 28 of the item 14 by taking a picture of the barcode 28 using the mobile device 30. The user may scan the item while using a specific application on the mobile device 30 corresponding to a food manufacturer or distributor, or the user may scan the item in the general camera application of the phone. Alternatively, the user may search a web browser of the mobile device 30 by inputting a picture of the barcode 28. In another example, the user does not user their mobile device to scan the barcode 28, but rather the vending machine 12 itself scans the barcode 28. Specifically, the camera 18 scans the barcode 28.

At 106, when the barcode 28 is scanned by the mobile device 30, the barcode 28 directs the mobile device 30 to information about the item 14. Such information may be stored on the server 22 and accessed via the Internet or another network. The information about the item 14 may be displayed on a web page of the food manufacturer or distributor, for example, or within a specialized application. Alternatively, in the example where the camera 18 scans the barcode 28, the information about the item 14 is displayed on the terminal 16.

The information presented to the user about the item 14 includes, for example, a history of the item 14, including history information that a user would consider relevant to the freshness of the item 14. Example information includes the creation date of the item, the expected expiration date of the item, the origin (i.e., City, State) of the item, and the shipping information. The shipping information may include timestamped or date-stamped information corresponding to various delivery locations, much the same as with tracking information for a package. A user may use this information to confirm the source of the item 14. The information may also include whether the item 14 is organic, and may further include a company's certification as to the authenticity of the food. When the item 14 is a perishable food item, such as a salad or sandwich, such information is highly relevant to the user. The food manufacturer and/or distributor also gains credibility with its customers by volunteering such information.

FIG. 2 also illustrates a second aspect 100B of the method 100. In the second aspect 100B of the method 100, information is gathered relating to the reaction of the user to the purchased item 14. This feedback can be compiled and studied to determine the success of a particular product or distribution process.

In the second aspect 100B of the method 100, an image of the user is captured, at 108. In particular, the image, which may be a picture or a video, is captured by the camera 18 of the vending machine 12. The image may be captured after steps 102, 104, and/or 106, as indicated by the dashed arrows in FIG. 2 depending on the type of reaction to be studied. For example, if one wants to study the user's initial reaction to the item 14, the image is captured following step 102. On the other hand, if one wants to study the reaction to the scanning process, the image is captured after step 104, and if one wants to study the reaction to the information displayed in step 106, the image is captured after step 106. This disclosure is not limited to these particular examples, and extends to images captured at other times. The controller 26 is configured to command the camera 18 to capture images at the relevant times.

After step 108, the image is analyzed to determine a facial expression of the user in the captured image, at 110. Step 110 may be performed locally at the vending machine 12, or the image may be transmitted to the server 22 or another remotely located computer, where the analysis takes place.

The analysis may attempt to compare the face of the user to known faces associated with emotions such as happy, content, upset, frustrated, etc. A scale may be used to rate the facial expression, with low numbers corresponding to dissatisfaction and high numbers corresponding to satisfaction. The determined facial expression is recorded, at 112, and stored on the server 22, for example, where the information can be compiled and used for further study. For example, the manufacturer and/or distributor will be able to compare reactions of satisfied and dissatisfied customers.

The first and second aspects 100A, 100B of the method 100 can be performed in parallel (i.e., together) or separately. In particular, this disclosure extends to methods and systems that perform the first aspect 100A but not the second 100B, and vice versa.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A method, comprising:
    capturing an image of a user after the user purchases an item from a vending machine;
    determining a facial expression of the user in the image;
    recording the determined facial expression; and
    rating the facial expression on a numerical scale.

2. The method as recited in claim 1, wherein the capturing step includes taking a picture of the user with a camera.

3. The method as recited in claim 1, wherein the capturing step is performed after the user scans the item to access information about the item.

4. The method as recited in claim 3, wherein the capturing step is performed after the information about the item is displayed to the user.

5. The method as recited in claim 1, wherein the image is one of a picture and a video.

6. The method as recited in claim 1, wherein low numbers on the scale correspond to dissatisfaction and high numbers on the scale correspond to satisfaction.

* * * * *